United States Patent [19]

Nishimori et al.

[11] Patent Number: 4,856,877

[45] Date of Patent: Aug. 15, 1989

[54] DISPLAY UNIT

[75] Inventors: Kadotaro Nishimori; Masazumi Ito, both of Toyokawa, Japan

[73] Assignee: Minolta Camera Kabushiki Kaisha, Osaka, Japan

[21] Appl. No.: 126,964

[22] Filed: Nov. 30, 1987

[30] Foreign Application Priority Data

Nov. 29, 1986 [JP] Japan .................................. 61-285163

[51] Int. Cl.⁴ .......................... G02F 1/135; G02F 1/01
[52] U.S. Cl. .................................... 350/356; 350/334; 350/345
[58] Field of Search ............... 350/356, 357, 334, 345, 350/339 D, 353; 340/716, 754

[56] References Cited

U.S. PATENT DOCUMENTS

| | | | |
|---|---|---|---|
| 4,126,384 | 11/1978 | Goodman et al. | 350/345 |
| 4,208,869 | 6/1980 | Hanaoka | 350/345 |
| 4,294,518 | 10/1981 | O'Connor et al. | 350/357 |
| 4,330,813 | 5/1982 | Deutsch | 350/345 X |
| 4,432,612 | 2/1984 | Nicholson et al. | 350/357 |
| 4,449,123 | 5/1984 | Muranaga | 350/334 X |
| 4,456,337 | 6/1984 | Nicholson | 350/357 |
| 4,562,433 | 12/1985 | Biferno | 340/716 |
| 4,580,877 | 4/1986 | Washo | 350/345 |
| 4,597,662 | 7/1986 | Hirata et al. | 355/14 R |
| 4,748,546 | 5/1988 | Ukrainsky | 350/345 |

Primary Examiner—Eugene R. LaRoche
Assistant Examiner—Nathan W. McCutcheon
Attorney, Agent, or Firm—Wenderoth, Lind & Ponack

[57] ABSTRACT

A display unit having a light-receiving type display device for displaying an information by receiving light from external light source and a self-illuminating type display device provided under the light-receiving type display device for acting as the external light source for the light-receiving type display device and for displaying information different from the information displayed by the light-receiving type display device. The light-receiving type display device and the self-illuminating type display device each display a predetermined pattern different from the other. Accordingly, this display unit is capable of displaying the predetermined patterns of the self-illuminating type display device by controllably causing the self-illuminating type display device to display its patterns and is also capable of displaying the predetermined patterns of the light-receiving type display device by controllably causing the self-illuminating type display device to act as the light source of the light-receiving type display.

10 Claims, 1 Drawing Sheet

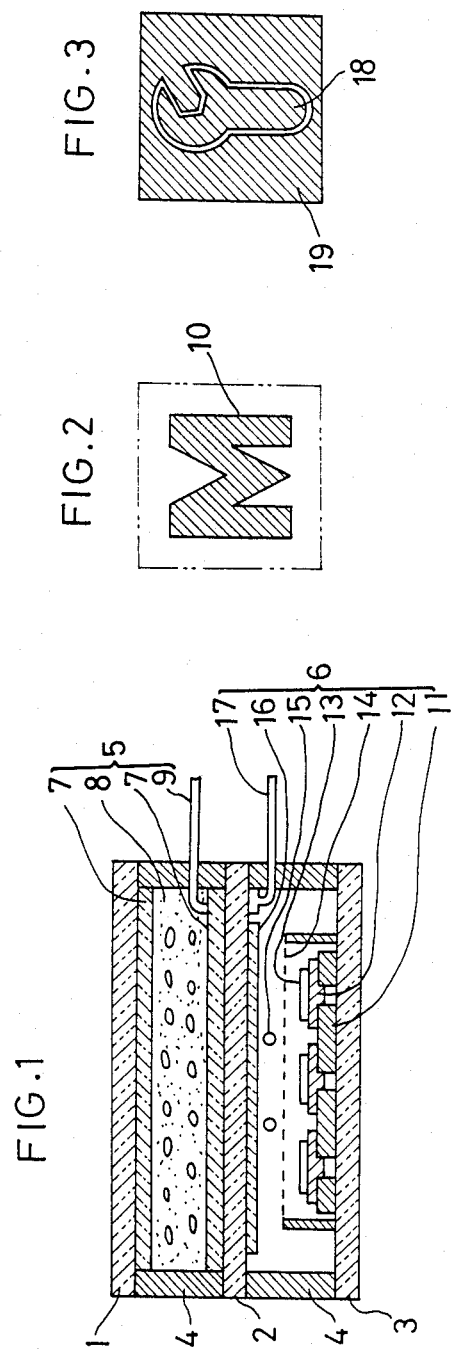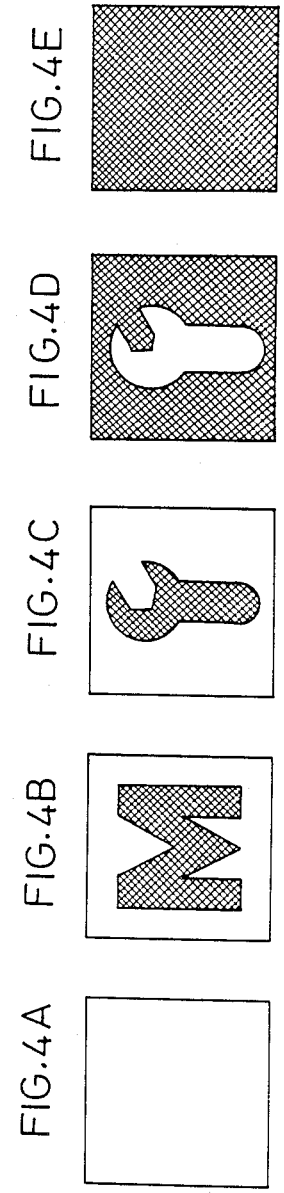

DISPLAY UNIT

BACKGROUND OF THE INVENTION

1. Field Of The Invention

The present invention relates to a display unit for converting various information into optical information, especially patterned information which may be visually recognized by a person and for displaying the same.

2. Description Of The Prior Art

Generally, there are known two types of the above-described display unit: the first type includes the vacuum fluorescent display (VFD) or the plasma display panel (PDP) which carries out displaying by its self-illumination, and the second type includes the liquid crystal display (LCD) or the electrochemical display (ECD) which carries out displaying by e.g. modulating light received from a separately provided light source. The first type is generically called a self-illuminating type display unit and the second type is generically called a light-receiving type display unit.

Conventionally, these types of display units, in the case of either the self-illuminating type display unit or the light-receiving type display unit, are respectively used in singularity.

However, in both of the two types of display units the amount of information, especially the number of information patterns, displayable in a predetermined display area is limited. On the other hand, as various instruments become more and more compact, it has been desired that the display unit should display as much information as possible in the smallest possible display area.

Therefore, it is the object of the present invention to provide a display unit capable of displaying an increased amount of information, especially an increased number of display patterns in a limited display area.

SUMMARY OF THE INVENTION

In order to accomplish the above object, according to the present invention, a display unit has a light-receiving type display device for displaying an information by receiving light from an external light source, and a self-illuminating type display device provided under the light-receiving type display device for acting as the external light source for the light-receiving type display device, and displaying information different from the information displayed by the light-receiving type display device.

According to one preferred embodiment of the present invention, if the self-illuminating type display device includes two independent self-illuminating sections, with one being adapted for displaying a predetermined first display pattern and the other being adapted for displaying the rest (constituting the negative of the first pattern), and if the light-receiving type display device is adapted for displaying a second pattern which is different from the first pattern, the following advantages will accrue. That is, by causing either of the two self-illuminating sections of the self-illuminating type display device to illuminate, it is possible to display the first pattern in the form of a positive or a negative. Further, by energizing the light-receiving type display device and at the same time by causing both of the self-illuminating sections of the self-illuminating type display device to illuminate, it is possible to display the second pattern with these two self-illuminating sections acting as a light source for the light-receiving type display device. As a result, compared with the aforementioned conventional arrangement in which the self-illuminating type display device or the light-receiving type display device is used in singularity, the number of displayable patterns may be substantially increased.

More specifically, in the case of the display unit related to the present invention, since the kinds of patterns displayable by the display unit are determined as various combinations of patterns displayable by the respective display devices, the kinds of display patterns may be increased compared with the single display device arrangement of the prior art. Consequently, the increased kinds of various information patterns may be displayed in a limited display area, thereby helping the instruments to be formed more compact.

BRIEF DESCRIPTION OF THE DRAWINGS

FIG. 1 is a section view showing one preferred embodiment of a display unit of the present invention, FIG. 2 is a plan view showing a display pattern of an LCD, FIG. 3 is a plan view showing a display pattern of a VFD. and FIGS. 4A, 4B, 4C, 4D, and 4E are plan views showing display conditions obtainable by variably controlling the LCD and the VFD.

DESCRIPTION OF THE PREFERRED EMBODIMENTS

Preferred embodiments of a display unit related to the present invention will be particularly described hereinafter with reference to the accompanying drawings.

Referring to FIG. 1, the display unit related to the present invention comprises three glass plates 1 through 3 disposed with a predetermined inter-distance provided by spacers 4, a liquid crystal display 5 (to be briefly referred to as LCD hereinafter), which is an example of the light-receiving type display device, disposed between the upper glass plate 1 and the intermediate glass plate 2 and a vacuum fluorescent display device 6 (to be briefly referred to as VFD hereinafter) disposed between the intermediate glass plate 2 and the lower glass plate 3.

The LCD 5 is a twisted nematic type, in which there are contained a pair of electrodes 7 and twistedly arranged liquid crystal cells 8 and also a leader line 9. The electrodes 7 are transparent and, as shown in FIG. 2, are formed in a predetermined pattern 10 (which is a letter 'M' in this embodiment) when seen in the plan view. When voltage is applied to the liquid crystal cells 8 via the electrodes 7 to vary the arrangement of longitudinal axes of molecules of the liquid crystal cells, light from the VFD 6 is blocked whereby the pattern 10 is formed.

Referring back to FIG. 1, the VFD includes an insulating film 11, an anode electrode 12 and a fluorescent element 13 formed on the lower glass plate 3 by the thick film printing processing, a grid electrode 14 disposed thereabove, a filament cathode 15 and a transparent electrically conductive film 16 formed on a lower face of the intermediate glass plate 2. A reference numeral 17 in the same figure denotes a leader line.

The anode electrode 12 and the fluorescent element 13, as seen in a plan view of FIG. 3, are formed in an illumination pattern 18 (in the shape of a spanner wrench in this embodiment) and in another illumination pattern 19 which constitutes the rest, i.e. the negative of the illumination pattern 18.

When the filament cathode 15 is heated to emit thermoelectrons thereby exciting the fluorescent element 13, the fluorescent element 13 is illuminated in either of the illumination patterns 18, 19 or in both of the same 18, 19 thereby carrying out displaying.

In operation, the display unit having the above-described construction carries out various displays by variably controlling the LCD 5 and the VFD 6 as will be described hereinafter.

(1) If both of the two illumination patterns 18, 19 of the VFD 6 are illuminated with the LCD 5 being kept unenergized, there is provided a clear lightened display condition displaying no mark or letter as shown in FIG. 4A.

(2) If both of the two illumination patterns 18, 19 of the VFD 6 are illuminated and the LCD 5 is energized, the letter 'M' is displayed as shown in FIG. 4B.

(3) If the LCD 5 is kept unenergized and one illumination pattern 19 of the VFD 6 alone is illuminated, a darkened mark of spanner is displayed against a lightened background as shown in FIG. 4C.

(4) If the LCD 5 is kept unenergized and the other illumination patter 18 of the VFD 6 alone is illuminated, a lightened mark of spanner is displayed against a darkened background as shown in FIG. 4D.

(5) If the LCD 5 is kept unenergized and the VFD 6 is also kept unenergized, there is provided a clear and darkened display condition displaying no mark or no letter.

As described above, in the case of the display unit related to the present invention, compared with the conventional arrangement utilizing only one of either the LCD 5 or the VFD 6, the VFD 6, which acts as a light source of the LCD 5, per se has its display patterns. Therefore, an increased number (kinds) of display patterns are obtained from various combinations of the display patterns of the two display devices 5, 6.

In the above-described embodiment, the display unit comprises the light-receiving type display device and the self-illuminating type display device respectively displaying different patterns. In place of this arrangement, it is also possible to employ a dot type display device as the light-receiving type display device with self-illuminating type display device alone being the pattern display type. The dot type display has a plurality of dot display elements, each of dot display elements being selectively energized for displaying the information. In this case, various combinations of the letter of the dot type display device and the mark of the pattern type display device may be displayed. In this alternate embodiment, the letter 'M' as shown in FIG. 2 is displayed as a group of dots.

Further, in the first embodiment, the LCD 5 and the VFD 6 shares the intermediate glass plate 2. Although this arrangement is advantageous in terms of reduction of size and cost of the display unit, it is also possible within the scope of the present invention to construct the display unit by forming the LCD 5 and the VFD 6 respectively between two different pairs of glass plates.

Instead of the twisted nematic type, the LCD 5 may also comprise other types such as the guest-host type or the phase change type.

Furthermore, as the light-receiving type display device, in place of the LCD 5, it is also possible to employ the electrochemical display (ECD), the scattered particle display (SPD) or other types. On the other hand, the self-illuminating type display device, in place of the VFD 6, may also comprise the plasma display panel (PDP), the electoluminescent display (ELD) or other types.

We claim:

1. A display unit, comprising:
   a light-receiving type display means for displaying information by receiving light from an external light source, said light receiving type display means having a first predetermined pattern to be displayed; and
   a self-illuminating type display means for displaying by self-illumination information different from the information displayed by said light-receiving type display means, said self-illuminating type display means having a second predetermined pattern to be displayed, and said self-illuminating type display means disposed under said light-receiving type display means so as to act as the external light source for said light-receiving type display means;
   said self-illuminating type display means illuminating all of said light-receiving type display means when said first predetermined pattern is displayed by said light-receiving type display means, and said light-receiving type display means being unenergized to transmit light from said self illuminating type display means when said second predetermined pattern is displayed by said self-illuminating type display means.

2. A display unit, comprising:
   upper, intermediate, and lower transparent plates, said transparent plates having means spacing said transparent plates from each other;
   a light receiving type display means for displaying information, said light receiving type display means having a first predetermined pattern to be displayed by receiving light from below said first predetermined pattern, and said light receiving type display means disposed between said upper transparent plate and said intermediate transparent plate; and
   a self-illuminating type display means for displaying by self-illumination information different from the information displayed by said light-receiving type display means, said self-illuminating type display means having a second predetermined pattern to be displayed, and said self-illuminating type display means disposed between said intermediate transparent plate and said lower transparent plate so as to emit light to said light-receiving type display device;
   said self-illuminating type display means illuminating all of said light-receiving type display means when said first predetermined pattern is displayed by said light-receiving type display means, and said light-receiving type display means being unenergized to transmit light form said self illuminating type display means when said second predetermined pattern is displayed by said self-illuminating type display means.

3. The display unit as set forth in claim 2, wherein:
   said light-receiving type display means comprises a liquid crystal display having liquid crystal cells and transparent electrodes binding said liquid crystal cells; and
   said self-illuminating type display means comprises a vacuum fluorescent display having a filament cathode and an anode covered by a fluorescent material.

4. The display unit as set forth in claim 3, wherein:
said transparent electrodes of said liquid crystal display are formed in predetermined patterns, and said anode of said vacuum fluorescent display is formed in a pattern different from said predetermined patterns of said transparent electrodes.

5. A display unit, comprising:
a light-receiving type display means for displaying information by modulating light form an external light source, said light-receiving type display means adapted to display a first predetermined pattern; and
a self-illuminating type display means for displaying information by self-illumination, said self-illuminating type display means including a first illuminating section adapted to display a second predetermined pattern different from said first predetermined pattern and a second illuminating section adapted to display the negative pattern of said second predetermined pattern, said self-illuminating type display means disposed under said light-receiving type display means to act as the external light source for said light-receiving type display means;
both of said first and second illuminating sections of said self-illuminating type display means being activated to illuminate said light-receiving type display means when said first predetermined pattern is displayed by said light-receiving type display means, and said light-receiving type display means being unenergized to transmit light from said self-illuminating type display means when said second predetermined pattern is displayed by said self-illuminating type display means.

6. A display unit having a light-receiving type display means for displaying information by modulating light from an external light source and a self-illuminating type display means for displaying information by self-illumination, where in the improvement comprises:
said light-receiving type display means adapted to display a first pattern; and
said self-illuminating type display means adapted to display a second pattern different from said first pattern, said self-illuminating type display means disposed under said light receiving type display device to act as the external light source for said light-receiving type display means;
said first pattern being displayed by said light-receiving type display means when said self-illuminating type display means is activated to illuminate said light-receiving type display means, and said second pattern being displayed by said self-illuminating type display means when said light-receiving type display means is unenergized to transmit light from said self-illuminating type display means.

7. The display unit as set forth in claim 6, wherein:
said light receiving type display means comprises a liquid crystal display device having liquid crystal cells and transparent electrodes binding said liquid crystal cells, at least one of said transparent electrodes formed in the shape of said first pattern.

8. The display unit asset forth in claim 6, wherein:
said self-illuminating type display means comprises a vacuum fluorescent display device having a filament cathode and an anode covered by a fluorescent material, said anode formed in the shape of said second pattern.

9. The display unit as set forth in claim 6, wherein:
said light-receiving type display means comprises a plurality of dot display elements, said dot display elements being selectively energized to display said first pattern.

10. The display unit as set forth in claim 9, wherein:
said self-illuminating type display means is adapted to be capable of only displaying said second pattern.

* * * * *